Patented Apr. 21, 1953

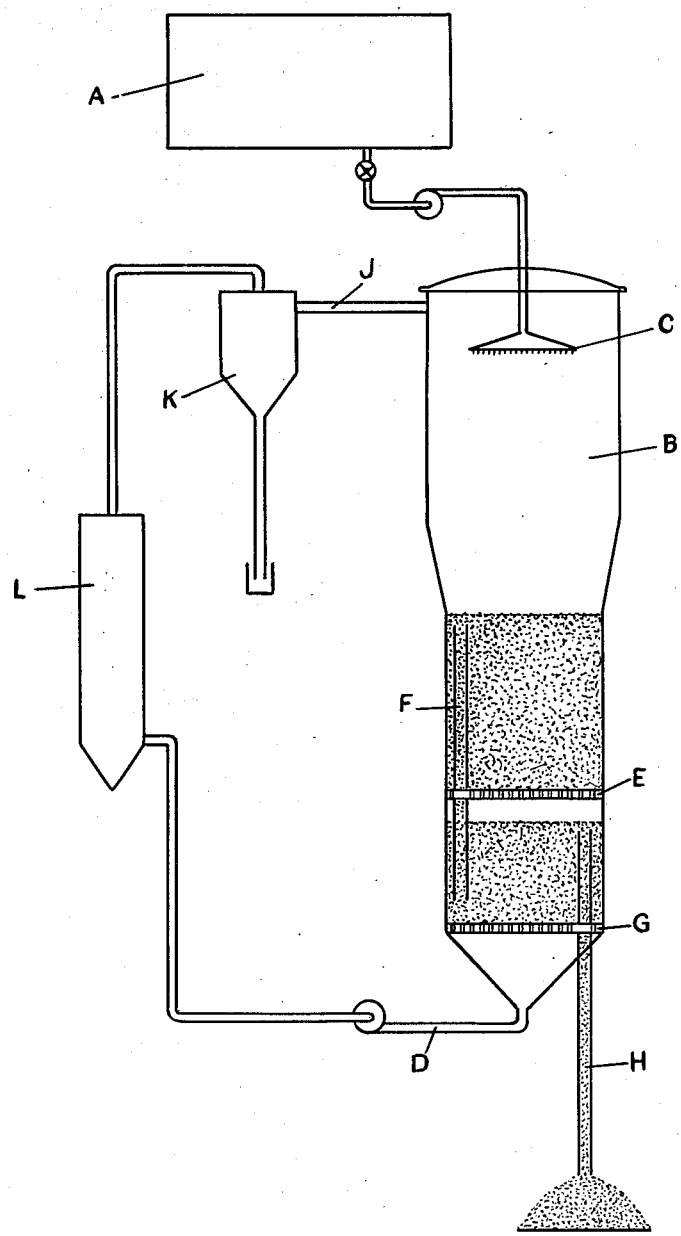

2,635,684

UNITED STATES PATENT OFFICE 2,635,684

MANUFACTURE OF CAUSTIC SODA GRANULES

Francis Mandeville Joscelyne, Northwich, England, assignor to Imperial Chemical Industries Limited, a corporation of Great Britain Application May 24, 1949, Serial No. 95,081

3 Claims. (Cl. 159—48)

This invention relates to a new and improved process for the manufacture of solid anhydrous caustic soda. More particularly, it is concerned with the evaporation of relatively concentrated solutions of caustic soda to give solid caustic soda containing less than 0.5% by weight of water.

It is known that highly concentrated solutions of caustic soda can be cooled so that anhydrous caustic soda crystallises out, but one difficulty involved in this process is the centrifuging and drying of the crystals so produced. In copending application, Serial No. 736,424 of F. M. Joscelyne, filed March 21, 1947, now Patent No. 2,556,185, there is described and claimed a new process which involves substantially adiabatic isothermal autoevaporation of a solution containing 80 to 95% NaOH at 200°–300° C. One method of carrying out this process is by spraying a caustic soda solution down a tower up which passes a current of air to carry off the water vapour; granular caustic soda collects at the bottom of the tower. In another use of this process, mother liquor adhering to hot centrifuged caustic soda crystals is autoevaporated in a rotating tube by a slow current of air, without applying heat to this dryer. The complete removal of water from caustic soda by these means, however, involves a relatively long time if the solid is to contain less than 0.5% $H_2O$.

A principal object of this invention is the provision of a new process for the preparation of solid caustic soda containing less than 0.5% by weight of water from concentrated aqueous solutions of caustic soda. Another object is the provision of improvements upon the autoevaporation method of caustic soda production as outlined in the preceding paragraph. A still further object is the provision of a new method for removing the last traces of water present in or adhering to particles of caustic soda formed from concentrated solutions of caustic soda.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by a process which comprises dehydrating caustic soda particles in a bed at a temperature between 200° and 300° C. by passing a gas stream up through the bed at sufficient velocity to keep the particles in a fluidised state. In more detail, the process comprises spraying an aqueous solution containing between 80% and 95% NaOH, at a temperature between 200° and 300° C., through an upward current of gas which is inert towards NaOH, e. g. air, so as to form granules of solid caustic soda and maintaining the granules so formed in a fluid state by a current of gas.

In the preferred form, permitting a maximum of heat recovery, a current of dry air is first passed up counter-current to the downflow of particles through a series of fluid beds of fluidised granules of NaOH, wherein the granules gradually become anhydrous, and then up through the falling spray of solution to remove the water vapour formed by autoevaporation of the solution.

The process may be operated in relatively simple equipment in which corrosion is at a minimum and little power or heat is consumed. Various types of apparatus may be used, but unusually good results are obtained by using a tapered tower, the taper being chosen such that the upward rate of flow of gas is sufficient at the bottom to keep the solid particles as an expanded or boiling bed, and insufficient at the top to cause appreciable entrainment of the spray. An important feature is the control of the spray evaporation to yield a solid of suitable particle size for dehydration in the expanded bed or boiling bed. Any known means can be employed for removing the anhydrous product from the fluid bed.

A more complete understanding of the procedures of this invention may be had by reference to the accompanying drawing in which the figure diagrammatically illustrates one form of apparatus which may be employed in carrying out the operations of the invention.

Referring in detail to the drawing, the stock tank A contains caustic soda solution which is pumped into the tower B through a spray C. Dry air is blown into the tower simultaneously at D. At B, the drops of caustic soda solution evaporate isothermally and adiabatically to give granules, which however are still moist. These granules collect on the perforated plate E where they are kept in fluidised motion, preferably as a boiling bed, by the upflow of air, and gradually they flow down the overflow pipe F. They then collect as hot, substantially anhydrous granules on the perforated plate G where they are again kept in fluidised motion. In this bed the granules are finally dehydrated and cooled, while the incoming air is warmed up. The cool dry granules then overflow out of the apparatus by the overflow pipe H. The moisture-laden air leaves the apparatus at J. The height of the tower may conveniently be 35 to 90 feet altogether, preferably being 6 to 10 feet between plates G and E, 10 to 30 feet of bed above plate E, and 10 to 30 feet between spray C and the top of the bed. The diameter of the tower may be 6 to 15 feet. The depths of the beds on the plates E and G should be sufficient to allow time for substantially complete dehydration. Depending on the conditions, a time between 5 minutes and 30 minutes is adequate.

For a more complete heat recovery it is often desirable to use more than two fluidised beds, so that the incoming air first meets a comparatively cool bed at about 100° C., and then rises through three or more beds in which the temperature progressively rises to 200°–280° C., preferably 250°–280° C. In order to keep these temperatures as high as convenient, the volume of air should not be too great, but the minimum volume of air is governed by the volume required to fluidise the beds and to carry off the water vapour liberated.

It is convenient to withdraw the moisture-laden air from near the top of the tower, through a cyclone K to remove fine particles of solid or spray which may be carried over, this material being returned to the feed tank, then pass the air through a cooler L to remove the moisture and preferably a reheater before returning it to the bottom of the tower.

The procedures of this invention are further illustrated by the following example of actual operations:

*Example 1*

The apparatus consisted of a semi-scale vertical tower equipped with spray nozzles at the top for introducing the liquor as fine droplets, an outlet for removing moisture-laden air, and a perforated plate at the bottom. A current of air at 200° C. was passed in through this perforated plate at a rate of 200 cubic metres per hour. A solution having a temperature of 280° C. and containing 92% NaOH was sprayed into the tower at a rate of 250 litres per hour. Granules of caustic soda collected on the perforated plate and dried further while maintained there for half an hour as a fluid bed. They ran off through an overflow pipe into a collecting chamber. The granules so obtained contained 0.07% $H_2O$.

Various gases may be employed to form the fluid current which is used to fluidise the caustic soda granules and also used for solidifying the sprayed caustic solution by countercurrent flow in contact with the sprayed droplets of solution. Air, which may if desired have been freed of $CO_2$ content and dried, is the preferred gas. The gas employed should not react with the caustic soda, i. e. it should be inert to the caustic soda, and examples of other gases which may be employed include methane, natural gas, rare gases, and the like. Preferably the gas current is recycled after treatment to remove water.

The size of the droplets formed by the spray or other methods for forming droplets of the causic soda solution is not critical and substantially any type of spraying nozzles or other means for this purpose can be used. However, especially good results are obtained when the apparatus is designed so as to yield droplets which form granules with an average particle size of between 0.2 and 2.0 mm. in diameter, preferably between 0.5 and 1.0 mm. in diameter. An important feature is to correlate the size of the spray drops, the depth of fall through the tower, and the rate of upward gas stream, in such a manner that the drops have become superficially dry granules when they land on the fluidised bed. In this way, any tendency for the caustic soda to solidify adhering to the walls, or to form lumps in the fluidised bed, is readily avoided. It is quite remarkable that such a correlation can be effected and that a liquid can be sprayed in this way on to a fluidised bed of granules without any formation of sticky lumps or scale. A preferred arrangement of spray is to spray the liquor upwards so that it rises considerably and then falls as granules on the fluidised bed. This gives better control of the initial drying and the particle size without involving any more height.

The rate of flow of gas stream will depend to a large extent upon the exact form and shape of the apparatus used in conducting the process. However, it is clear that the velocity of gas flow in the zone in which the solid NaOH granules are allowed to accumulate should be in a range which forms an expanded or boiling bed of particles, herein referred to as a fluidised bed, and should not be in the velocity range which causes the particles to be entrained and carried over into the zone in which the caustic soda solution droplets are contacted with the gas current prior to solidification. However, when the preferred type of apparatus, a tapered tower, is used, the possibility of entrainment of particles is greatly minimised, because a velocity of gas flow in the base of the tower sufficient to cause the granules to be fluidised will automatically decrease below the rate, in the upper portion of the tower, where entrainment of particles or droplets can occur. Conducting the process so as to form particles of the preferred size indicated above, however, good results are obtained using a velocity of gas between 0.5 and 10 feet per second, preferably between 1 and 6 feet per second and especially between 2 and 4 feet per second, in the zone where the solid granules are fluidised.

When a stream of gas is passed upwards through a bed of discrete particles, the pressure drop at first increases linearly with increase in the gas velocity. A point is reached after which the pressure drop does not increase so quickly with gas velocity, the bed volume increases by about 10%, and the bed assumes some of the properties of a liquid, for example the bed can be stirred or poured, which might be called "an expanded bed." With further increase in gas velocity, a motion similar to that observed on the surface of a boiling liquid is assumed by the particles, and this might be described as a "boiling bed." At this point, the pressure drop is substantially independent of the velocity. Still further increase in gas velocity causes further expansion of the bed, and then entrainment of the particles in the gas stream, which state can be described as an "entrained stream."

The term "fluidised state," as referred to in this specification, is used to define generically both particles in an expanded bed and also particles in a boiling bed, as described above.

What I claim is:

1. A process for the production of caustic soda in the form of granules having a water content less than 0.5% by weight which comprises spraying an aqueous solution containing between 80 and 95% by weight of NaOH having a temperature between 200° and 300° C. into a confined zone upwardly through which a current of substantially non-heat supplying inert gas is passed, allowing the droplets of sprayed solution to form granules of solid caustic soda by contact with said gas current, accumulating the resulting granules as a bed, the said spray being positioned a distance above the said bed so that having regard to the size of the spray droplets, the depth of fall through the confined zone, and the direction of the spray, the spray droplets are dried to form superficially dry granules when they land on the bed, passing the said current of dry gas up through said bed at a velocity which maintains the granules in a fluidised state and withdrawing granules from said bed.

2. A process for the production of caustic soda in the form of granules having a water content less than 0.5% by weight which comprises spraying an aqueous solution containing between 80 and 95% by weight of NaOH having a temperature between 200° and 300° C. into a tapered zone in countercurrent contact with an upward current of inert gas, said zone being tapered downward, whereby the velocity of said gas current is greater at the bottom of the zone than at the top, allowing the droplets of sprayed solution to fall downward through said gas current forming granules of solid caustic soda, accumulating the resulting granules as a bed at the base of said zone, the velocity of the gas current at said base being such as to maintain the bed of granules in a fluidised state, and withdrawing granules from said bed.

3. A process for the production of caustic soda in the form of granules having a water content less than 0.5% by weight which comprises spraying an aqueous solution of sodium hydroxide containing between 80 and 95% by weight of NaOH having a temperature between 200° and 300° C. into a confined zone upwardly through which passes a current of substantially non-heat supplying dry air, said dry air passing on entrance into said confined zone through a bed of NaOH granules having a temperature of between about 250° and 280° C. at a velocity which maintains the granules in a fluidized state, allowing the droplets of sprayed solution to form granules of solid caustic soda by contact with said air current, accumulating the resulting granules in said bed of NaOH granules, the said spray being positioned a distance above the said bed so that having regard to the size of the spray droplets, the depth of fall through the confined zone, and the direction of the spray, the spray droplets are dried to form superficially dry granules when they land on the bed, withdrawing granules from said bed and conveying them to a second confined zone containing a bed of granules having a temperature of between about 100° and 200° C. which are maintained in a fluidized state by the upward passage of said current of dry air passed first therethrough, said latter air current being passed at least in part into said first confined zone, removing NaOH granules from said second confined zone and collecting said removed granules.

FRANCIS MANDEVILLE JOSCELYNE.

References Cited in the file of this patent

UNITED STATES PATENTS

| Number | Name | Date |
|---|---|---|
| 1,026,724 | Trump et al. | May 21, 1912 |
| 1,852,303 | Heath | Apr. 5, 1932 |
| 1,877,733 | Martin | Sept. 13, 1932 |
| 2,054,441 | Peebles | Sept. 15, 1936 |
| 2,270,903 | Rudbach | Jan. 27, 1942 |
| 2,437,334 | Roetheli | Mar. 9, 1948 |
| 2,438,728 | Tyson | Mar. 10, 1948 |
| 2,475,984 | Owen | July 12, 1949 |
| 2,477,454 | Heath | June 26, 1949 |
| 2,480,639 | Ferguson | Aug. 30, 1949 |
| 2,485,604 | Ralbach | Oct. 25, 1949 |
| 2,556,184 | Hedley | June 12, 1951 |
| 2,556,185 | Joscelyne | June 12, 1951 |
| 2,561,392 | Marshall | July 24, 1951 |
| 2,561,394 | Marshall | July 24, 1951 |
| 2,567,959 | Munday | Sept. 18, 1951 |